(12) United States Patent
Thiel

(10) Patent No.: US 11,441,892 B2
(45) Date of Patent: Sep. 13, 2022

(54) TERAHERTZ MEASURING DEVICE AND TERAHERTZ MEASURING METHOD FOR MEASURING OBJECTS TO BE INSPECTED

(71) Applicant: INOEX GmbH Innovationen und Ausruestungen fuer die Extrusionstechnik, Melle (DE)

(72) Inventor: Marius Thiel, Osnabrueck (DE)

(73) Assignee: INOEX GmbH Innovationen und Ausruestungen fuer die Extrusionstechnik, Melle (DE)

(*) Notice: Subject to any disclaimer, the term of this patent is extended or adjusted under 35 U.S.C. 154(b) by 401 days.

(21) Appl. No.: 16/628,336

(22) PCT Filed: Jul. 4, 2018

(86) PCT No.: PCT/DE2018/100614
§ 371 (c)(1),
(2) Date: Jan. 3, 2020

(87) PCT Pub. No.: WO2019/007465
PCT Pub. Date: Jan. 10, 2019

(65) Prior Publication Data
US 2020/0173766 A1   Jun. 4, 2020

(30) Foreign Application Priority Data

Jul. 4, 2017   (DE) .................. 10 2017 114 879.5

(51) Int. Cl.
*G01B 11/02*   (2006.01)
*G01B 11/06*   (2006.01)
(Continued)

(52) U.S. Cl.
CPC ............ *G01B 11/026* (2013.01); *G01B 11/06* (2013.01); *G01B 11/08* (2013.01); *G01B 11/2408* (2013.01); *G01N 21/3581* (2013.01)

(58) Field of Classification Search
CPC ....... G01B 11/026; G01B 11/06; G01B 11/08; G01B 11/2408; G01N 21/3581
See application file for complete search history.

(56) References Cited

U.S. PATENT DOCUMENTS 10,584,957 B2    3/2020 Thiel et al.
11,226,286 B2 *  1/2022 Ochiai .................. G01B 15/02
(Continued)

FOREIGN PATENT DOCUMENTS

CN    103575654 A  *  2/2014
CN    103575654 A     2/2014
(Continued)

OTHER PUBLICATIONS

International Search Report in PCT/DE2018/100614, dated Oct. 29, 2018.
(Continued)

*Primary Examiner* — Rebecca C Bryant
(74) *Attorney, Agent, or Firm* — Collard & Roe, P.C.

(57) ABSTRACT

The invention relates to a terahertz measuring apparatus (1) for run-time measurements of test objects (8), in particular, for layer thickness measurements and distance measurements of the test objects (8), whereby the terahertz measuring apparatus (1) comprises:
a transmitter and receiver unit (2) for emitting a terahertz radiation (10) along an optical axis (A) and for receiving reflected terahertz radiation,
a controller and evaluation unit (3) for driving the transmitter and receiver unit (2) and evaluating measuring signals (M) of the transmitter and receiver unit (2).
Hereby, it is provided that
a beam splitter (4) is provided to split up the emitted terahertz radiation (10) into at least one first partial terahertz radiation (10a) and one second partial terahertz radiation (10b) along different optical partial axes (A1, A2),
(Continued)

a reflection device (5) for reflecting the second partial terahertz radiation (10*b*) along a second optical partial axis (A2) different from the first optical partial axis (A1) of the first partial terahertz radiation (10*a*, 10*b*) and reflecting back the second partial terahertz radiation (10*b*), reflected from the test object (8), towards the beam splitter (4) and/or the transmitter and receiver unit (2), whereby the transmitter and receiver unit (2) generates a common measuring signal from the partial beams (10*a*, 10*b*) reflected on the test object (8) and puts it out to the controller and evaluation unit (3) for determining at least one layer thickness and/or one distance of the test object (8).

18 Claims, 2 Drawing Sheets

(51) Int. Cl.
  *G01B 11/08* (2006.01)
  *G01B 11/24* (2006.01)
  *G01N 21/3581* (2014.01)

(56) References Cited

U.S. PATENT DOCUMENTS

| | | | |
|---|---|---|---|
| 2018/0112973 | A1 | 4/2018 | Sikora |
| 2021/0310938 | A1* | 10/2021 | Korn ................ G01J 3/453 |

FOREIGN PATENT DOCUMENTS

| | | |
|---|---|---|
| JP | H03-71003 A | 3/1991 |
| JP | 2019-500629 A | 1/2019 |
| WO | 2016/139155 A1 | 9/2016 |
| WO | 2017/101906 A | 6/2017 |

OTHER PUBLICATIONS

Nuria Llombart et al. "Time-Delay Multiplexing of Two Beams in a Terahertz Imaging Radar," IEEE Transactions On Microwave Theory Ano Techniques, Plenum, USA, vol. 58, No. 7, Jul. 1, 2010 (Jul. 1, 2010), pp. 1999-2007, ISSN: 0018-9480, XP011310925.

Thomson Scientific, London, GB; vol. 2014, No. 26, Dec. 31, 2014 (Dec. 31, 2014 ), AN 2014-G52858, abstract No. 0, Retrieved from: Database WPI [online] XP002785281.

* cited by examiner

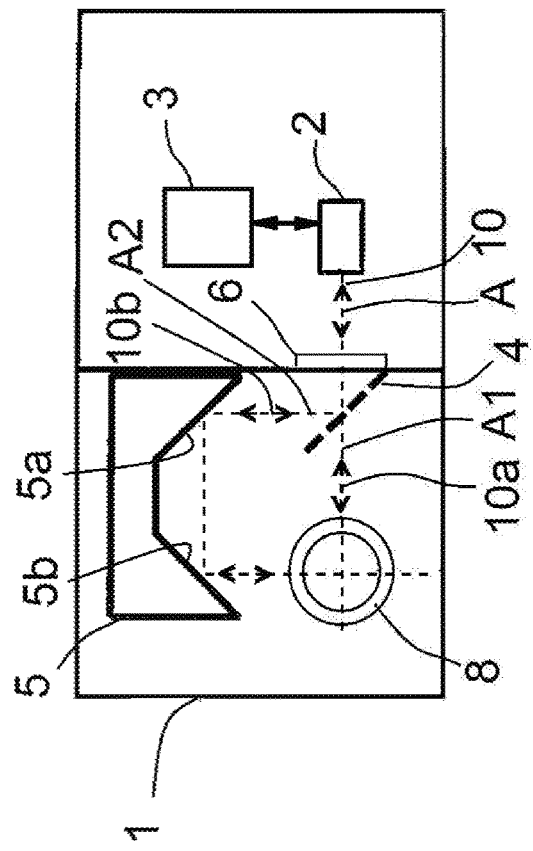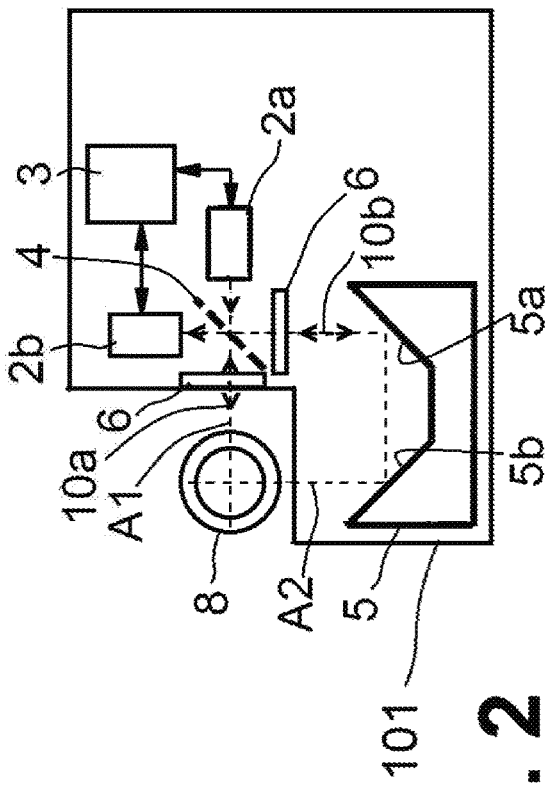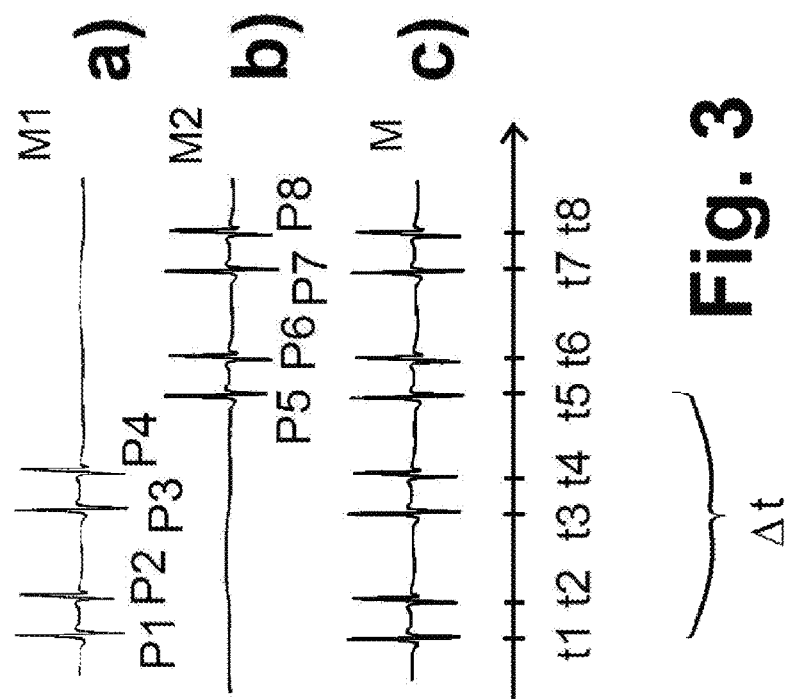

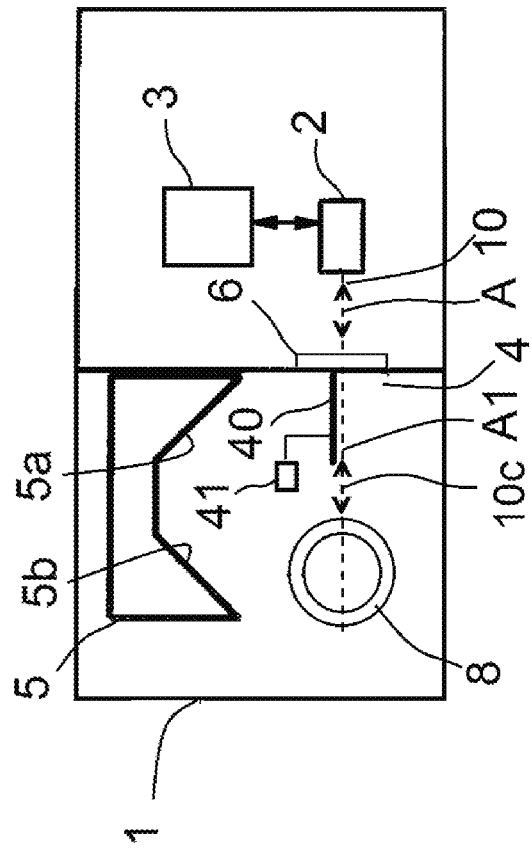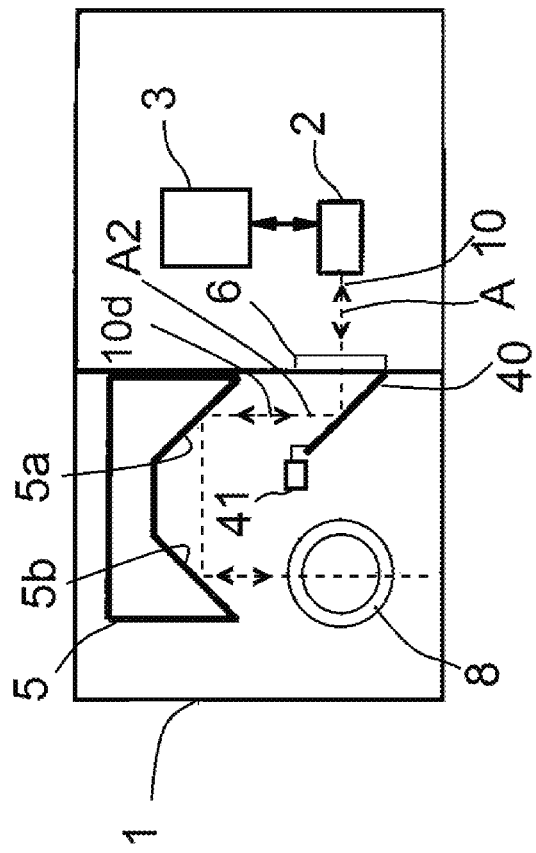

TERAHERTZ MEASURING DEVICE AND TERAHERTZ MEASURING METHOD FOR MEASURING OBJECTS TO BE INSPECTED

CROSS REFERENCE TO RELATED APPLICATIONS

This application is the National Stage of PCT/DE2018/100614 filed on Jul. 4, 2018, which claims priority under 35 U.S.C. § 119 of German Application No. 10 2017 114 879.5 filed on Jul. 4, 2017, the disclosure of which is incorporated by reference. The international application under PCT article 21(2) was not published in English.

The invention relates to a terahertz measuring apparatus and a terahertz measuring method for measuring test objects by means of run-time measurements. Hereby, in particular, it is possible to measure test objects or objects to be measured respectively made of plastics material, ceramics and, for example, also paper or cardboard, that are permeable for terahertz radiation while having a refraction index materially differing from that of air so that the terahertz radiation is partially reflected upon passing the boundary surface and, thus, the layer thicknesses between the boundary surfaces can be determined from the run-time differences of the measuring peaks or measuring signals respectively.

Thus, it is possible to measure, in particular, also pipes and hoses, whereby, in this case, the terahertz radiation can be guided, for example, through one front and subsequently through one back wall area each so that that both wall areas and, thereby, at least four boundary surfaces are covered. Thus, for obtaining a measurement of the entire circumference of a pipe, a swivel angle of the measuring device relative to the test object of e.g. 180° may be sufficient in principle.

However, a large swivel angle always requires an increased measuring effort. Moreover, for example, when using terahertz radiation with optical transmitter and receiver units, e.g. using femtosecond lasers, the mass to be swivelled is considerable. As an alternative hereto, it is known to arrange a multiplicity of terahertz measuring apparatuses around a test object, which in turn is associated with increased cost for the apparatus.

The invention is based on the object of creating a terahertz measuring apparatus and a terahertz measuring method allowing the test object to be measured with little effort and at low cost.

This task is solved by a terahertz measuring device and a terahertz measuring method according to the independent claims. Preferred further developments are described in the sub-claims. Further, an array made of the terahertz measuring apparatus and the test object to be measured is provided.

The terahertz measuring apparatus according to the invention can be used, in particular, for carrying out the des terahertz measuring method according to the invention. Further, the terahertz measuring method according to the invention is provided, in particular, in connection with using or utilising respectively the terahertz measuring apparatus according to the invention so that both may be utilised in combination.

The invention is based on the idea of using one terahertz beam emitted from the transmitter and receiver unit to generate at least two terahertz detection beams and to direct them onto the test object at different optical axes, whereby the detection beams cover distances of different length and can be subsequently detected. Hereby, they can be detected in different embodiments: in one alternative, a measurement can be taken in a single measuring signal in which it can then be separated, or, in another alternative, a measurement can be taken in separate measuring signals.

Thus, a considerable advantage of the invention lies in the fact that one measuring device can be used to cover several areas of the test object. Thus, for example, one terahertz measuring apparatus or one terahertz measuring head respectively can be omitted in that an existing terahertz measuring head is merely supplemented with a beam separating device and a reflection device.

To that end, according to a first embodiment, a beam splitter, for example a semi-permeable mirror, may be provided as a beam separating device for separating the emitted terahertz radiation, for example, partially passing the emitted terahertz beam and partially deflecting the same, e.g. by 90°. To that end, the second terahertz beam is reflected by a reflection device so that a longer optical distance is created, for example, with double reflection. Thus, the second optical partial axis can be directed in a manner offset against the first optical partial axis by any desired angle, e.g. 90°.

Hereby, it is possible already to simultaneously measure twice the number of partial areas of the test object. Thus, in the case of small tubes and hoses each partial terahertz beam can detect a front and a back wall area and, hence, by means of the two partial beams, four wall areas can be covered in a single measurement.

A particular advantage of the beam splitting with deflection and subsequent reflection lies in the fact that an extended travel distance or, respectively, run-time is attained, making it possible to clearly separate the measuring signals or measuring peaks respectively in the signal. In particular, the separated measurements can be acquired one after another or successively in time and, thereby, also, preferably, be evaluated successively and separately.

As an alternative to using a beam splitter, it is also possible to carry our successive measurements using the two detection beams. To that end, e.g. an adjustable mirror may be provided in the optical axis of the THz transmitter device as beam separating device which may be e.g. passive in a first position passing the transmission beam and deflecting the transmission beam in a second position. The adjustable mirror may be adjusted with low mass, e.g. as a thin metal disk, between exactly the two positions so that e.g. a stepper motor with low output, e.g. without gears and with a rapid switching frequency, can be utilised, which has a long life, is low in mechanical wear and energy efficient.

Further, in both embodiments various transmitter devices may be utilised:

In one embodiment comprising a combined transmitter and receiver unit, i.e. a terahertz transceiver, advantageously, the beam separating device may also be used for reflecting the second terahertz detection beam reflected back from the test object to the common transmitter and receiver unit. Thereby, existing systems of this type can be retrofitted cost-effectively and easily.

Hereby, the reflection device may be provided, for example, with two reflecting surfaces, for example, each for deflecting the optical axis by 90°, thereby exactly defining the optical delay distance which is sufficiently large.

According to an embodiment alternative to the combined terahertz transceiver, the transmitter and receiver units may be provided separately. Thus, in such a receiver unit the terahertz beam emitted from the transmitter unit may, for example, be guided along the optical axis towards the test object and reflected by this, and the deflected, second terahertz detection beam may be guided in the offset, second axis towards the test object and reflected back. Hereby, the beam separating device may be used to reflect the first partial beam reflected from the test object towards the receiver unit and to pass the second terahertz detection beam reflected from the test object. Thus, device embodiments with separate transmitter and receiver units are possible which are easy to realise as an apparatus, in particular also with optical terahertz devices using short pulse (femtosecond) lasers.

The terahertz radiation may be in a range of, in particular, between 10 GHz and 50 THz or 10 GHz and 10 THZ, for example 10 GHz to 3 THz. It may be emitted, in particular, in a pulsed manner. Hereby, in particular, optical systems are advantageous, i.e. those operating with optical generation, for example, using short pulse (femtosecond) lasers. In principle, however, for example, fully electronic systems may be utilised, e.g. also using frequency modulation.

The evaluation, too, can be realised in a simple manner in terms of apparatus and software. Thus, even in the embodiment using a beam splitter and, thereby, simultaneous measurement, the individual signals can be separated: owing to the fact that the delay distance or, respectively, distance difference of the two optical partial beam towards the test object and back is larger than the corresponding distance of the first partial beam through the test object and back, the measuring signals of the two measurements of the partial beams can be separated in the common measuring signal and the measuring peaks can be associated with the individual boundary surfaces of each measurement. Thus, there will be no compromise in quality compared to separate measurements.

The invention is illustrated below by means of the attached drawings in a few embodiment examples. The drawings show:

FIG. 1 a terahertz measuring apparatus according to a first embodiment with a beam splitter in an embodiment with combined transmitter receiver unit;

FIG. 2 a terahertz measuring apparatus with a beam splitter in an embodiment with separate transmitter and receiver units;

FIG. 3 a) the reflection signal of a first partial beam; b) the reflection signal of a second partial beam; c) the measuring signal as super-imposed input signal from both partial signals;

FIG. 4 a second embodiment with an adjustable mirror in a first mirror position; and FIG. 5 the second embodiment in a second mirror position.

According to FIG. 1, a terahertz measuring apparatus 1 for measuring a test object 8 comprises a transmitter and receiver unit 2, a controller and evaluator unit 3, a semi-permeable mirror 4 as beam splitter, further a reflection device 5, and, generally, also a lens 6 as additional optical device. The transmitter and receiver unit 2 emits terahertz radiation 10 via the lens 6 along an optical axis A that is split up by the beam splitter 4 into a first partial terahertz radiation 10a and a second partial terahertz radiation 10b. The first partial terahertz radiation 10a impinges upon the test object 8 along a first optical partial axis A1; the second partial terahertz radiation 10b impinges upon the test object 8 along a second optical partial axis A2 different from the first optical partial axis A1.

Here, a semi-permeable mirror is provided as beam splitter 4 that is not perpendicular to the optical axis 10, for example, at an angle of about 45°, so that the second partial terahertz radiation 10b is deflected by 90° and the first partial terahertz radiation 10a continues along the optical axis A and, in accordance with this embodiment, is directed directly onto the test object 8. The second optical second partial terahertz radiation 10b is subsequently reflected from the reflection device 5; according to the embodiment shown, the reflection device 5 is provided with two reflective surfaces 5a and 5b for twice reflecting the second optical second partial terahertz radiation 10b so that the second optical partial radiation 10b impinges upon the test object 8 with its second optical partial axis A2, which, according to this embodiment, is offset against the first optical partial axis A1, for example, by 90° in the plane shown.

AT THE test object 8 the partial terahertz beams 10a and 10b are each reflected on boundary surfaces. According to FIG. 1, a tube with a tube outer wall and a tube inner wall is measured as test object 8, whereby both partial terahertz beams 10a and 10b pass through the entire tube 8 thereby being reflected each at a first and a second wall area so that each of the partial terahertz beams 10a, 10b is reflected on four boundary surfaces. Both partial beams 10a and 10b each pass through the boundary surfaces at a right angle thereby each being reflected back so that the reflected first partial terahertz radiation 10a is in turn reflected along the first partial optical axis A1 and, correspondingly, the reflected second partial terahertz radiation 10b along the second partial optical axis A2.

Thus, the reflected first partial terahertz radiation 10a passes, at least partially or with a faction of its intensity respectively, again through den semi-permeable mirror 4 and through the lens 6 back to the transmitter and receiver unit 2. FIG. 3a) shows the first measuring signal M1 which is received by the transmitter and receiver unit 2 through the first partial terahertz radiation 10a: upon hitting the surface of the front wall area of the test object 8, which is made up of a plastics material having a refraction index n8=1.5, and subsequently, when exiting the wall area of the pipe 8 measuring peaks P1, P2 are generated each, whereupon, subsequently, the first partial terahertz radiation 10a further passes through the pipe 8 and is again partially reflected on the back wall area at the inner side, i.e. then transitioning from the refraction index of approximately n=1 of the air to the refraction index of e.g. n8=1.5 of the plastics material of the pipe 8, and, subsequently, again upon exiting the test object 8 so that here, too, two further measuring peaks P3, P4 are generated, which, consequently, are successive in the temporal measuring diagram of the first measuring signal M1. The temporal distance t2−t1 or, respectively, t4−t3 indicates the wall thickness of the pipe 8 an, the temporal distance t3−t2 indicates the interior diameter and t4−t1 the outer diameter of the pipe 8, under proper consideration of the refraction indices and propagation speeds respectively.

Thus, the second optical partial terahertz radiation 10b hits the test object 8 at a second optical partial axis A2, which is different from the first optical partial axis A1, for example perpendicular thereto, and, therewith, hits other wall areas. The second partial terahertz radiation 10b generates a measuring signal M2, shown in FIG. 3b), with correspondingly four measuring peaks P5, P6, P7, P8, whereby the second measuring signal M2, due to the longer run-time of the second partial terahertz radiation 10b, which may hit the test object 8, in particular, instead of passing directly from the semi-permeable mirror 4 towards the test object 8, by virtue of the multiple reflections on the reflection device 5, after a longer optical path so that the second measuring signal M2 is delayed in time compared to the first measuring signal M1.

Hereby, the measuring geometry, in particular also the arrangement and design of the reflection device 5, is provided in such a manner that the additional optical partial distance, i.e. the delay distance or delay section, is larger than the optical way covered by the first partial terahertz beam when passing and reflecting the entire test object 8. Thus, the second measuring signal M2 is offset against the first measuring signal M1 by a temporal duration Δt=t5−t1 so that the peaks P1 through P8 can be separated unambiguously.

Thus, in this way it is possible in the common measuring signal M to determine the wall thickness wd in one spot as wd=c (ti−tj)/2n, where c=speed of light, n=refraction index of the material for the THz radiation and ti−tj as temporal distance of the measuring peaks Pi and Pj, correspondingly also the pipe diameter between the measuring peaks P2 and P3 as well as P7 and P6.

Die embodiment of FIG. 1 can also be used, in particular, for retrofitting an existing terahertz measuring apparatus which already comprises the transmitter and receiver unit 2, controller and evaluation unit 3 and possibly the lens 6. Hereby, accordingly, the beam splitter 4 and the reflection device 5 must be retrofitted so that, in accordance with the measuring signal M of FIG. 3c), the twice the number of wall areas can be measured in a single measurement compared to the previous system. Thus, it is possible, for example, to measure a pipe as test object 8 already by pivoting the terahertz measuring apparatus 1 about an angle of merely 90° because each partial beam 10a and 10b passes through the pipe 8 entirely thereby covering a front and back wall area each.

The embodiment of FIG. 2 shows a terahertz measuring apparatus 101 comprising a transmitter unit 2a for emitting a terahertz beam 10 and receiver unit 2b separate from the former. The transmitter unit 2a again emits a terahertz beam 10 through the beam splitter 4 so that a first partial terahertz radiation 10a reaches the test object 8 directly—for example, again through a lens 6—again generating the peaks P1, P2, P3, P4—corresponding to the embodiment of FIG. 1—upon passing the boundary surface. Moreover, inside the beam splitter 4 the second partial terahertz radiation 10b is split off which again reaches other wall areas of the test object 8 via the reflection device 5 in a second optical partial axis A2, hereby, beginning at the beams splitter 4, following a delay distance (delay section) compared to the path of the first optical partial beam 10a, said delay line being larger than the optical path of the first optical partial beam 10a in the test object 8 so that—corresponding to FIG. 1—the further measuring peaks P5, P6, P7, P8 reach the beam splitter 4 and the receiver unit 2b clearly temporally separate from the first measuring peaks P1, P2, P3, P4.

Thus, in the embodiment of FIG. 2, the transmitter unit 2a and the receiver unit 2b are separate, i.e. not designed as a transceiver, allowing for the apparatus to be made simpler.

The shares not reflected towards the receiver unit 2b in the beam splitter 4 in the two embodiments are not shown for simplicity.

The embodiments can each be designed to comprise other reflection devices 5. In principle, it is also possible to provide a multiplicity of such beam splitters 4 in order to split up the terahertz beam 10 into several, i.e. more than two, partial terahertz beams.

Thus, both embodiments, each one with only one measuring head or one terahertz measuring apparatus 1, 101 respectively, allow the test object 8 to be measured along two partial optical axes A1, A2 and, therewith, twice the number of wall areas. Thus, for example, the pivoting distance of the terahertz measuring apparatus 1, 101 is each cut by half or markedly reduced compared to a prior known design. This does not compromise the quality of the measurement since the measuring peaks P1-P8 of the measurements are clearly and, therefore, can be evaluated separately.

Correspondingly, in the terahertz measuring method according to the first embodiment according to the invention:

a terahertz beam 10 is put out along an optical axis A,
the optical terahertz beam 10 is split up into at least one first partial terahertz radiation 10a and at least one partial terahertz radiation 10b, which are guided into different direction by means of a beam splitter 4,
whereby the second partial terahertz beam 10b is reflected, preferably twice or more often, at a reflection device 5,
subsequently, the partial terahertz beams 10a, 10b are guided in different partial optical axes A1, A2 and onto different areas or spots respectively onto the test object 8, pass this while being dieses partially reflected at border transitions, in particular, layer boundaries, are being reflected back and travel back along their partial optical axes A1 and A2,
the partial terahertz beams 10a and 10b reflected from the test object 8 are then reflected via the beam splitter 4 and detected by a transmitter and receiver unit which may be designed as a combined transmitter and receiver unit 2 (transceiver) or alternatively separately as a transmitter unit 2a and receiver unit 2b,
so that run-times t1-t8 of the radiation at different boundary surfaces of the various wall areas are detected upon both partial optical measurements and
due to a larger delay distance of the partial optical beams compared to the measuring distance in the test object 8—can be separated,
so that layer thicknesses or distances respectively of the test object 8 at several areas can be determined by means of the controller and evaluation unit 3 and, for example, checked for errors.

FIGS. 4 and 5 show a further embodiment in which an adjustable mirror 40 is provided as beam separating device which is adjusted by means of an adjustment means 41 back and forth between its two positions.

The adjustable mirror 40 may be designed e.g. as a thin metal plate, e.g. from aluminium, with low mass and thereby low moment of inertia, which is pivoted by the adjustment means 41. Thus, in the first, passive position of FIG. 4, the adjustable mirror 40 may be disposed outside the optical axis A or, alternatively, lie flat inside thereof, thereby having no or not relevant influence on the terahertz radiation 10.

According to FIG. 5, the adjustable mirror 40 is in its second, active position in which it deflects the emitted THz radiation 10, e.g. by 90°, as a second, adjustable detection beam 10d, whereby, in this measurement, too, there happens no reduction of the signal amplitude; however, in this embodiment of FIGS. 4, 5, too—as explained in connection with the embodiments relating to FIGS. 1 and 2, there is a temporal delay of the measuring peaks P5 through P8 of the second axis compared to the measuring peaks P1 through P4 of the first axis, according to FIG. 3.

Thus, according to this embodiment of FIGS. 4, 5 a measurement can be carried out which allows a higher signal amplitude, compared to the partial measurements using semi-permeable mirrors, because the THz beam 10 is not split up.

While accepting the impairment of a mechanical adjustment the benefit is that a higher signal amplitude can be attained. The adjustment means 41 may be e.g. a stepper motor sein adjusting the mirror 40 directly—without gear-

LIST OF REFERENCE NUMERALS 1, 101 terahertz measuring apparatus
2 transmitter and receiver unit (transceiver)
2a transmitter unit
2b receiver unit
3 controller and evaluation unit
4 beam splitter, for example, semi-permeable mirror
5 reflection device, for example, comprising two reflection surfaces
6 lens
8 test object, in particular, small hose or pipe made of plastics
10 emitted terahertz radiation
10a first partial terahertz beam
10b second partial terahertz beam
10c first adjustable detection beam
10d second adjustable detection beam
40 adjustable mirror
41 adjustment means, e.g. stepper motor
A optical axis
A1 first optical partial axis
A2 second optical partial axis
M common measuring signal
M1 first measuring signal
M2 second measuring signal
P1 through P8 measuring peaks in the measuring signal (M)
t1 through t8 times of the measuring peaks in the measuring signal (M)

The invention claimed is:

1. A terahertz measuring apparatus (1, 101) for run-time wall thickness measurements of test objects (8), said terahertz measuring apparatus (1, 101) comprising:
   a transmitter and receiver unit (2; 2a, 2b) for emitting a terahertz radiation (10) along an optical axis (A) and for receiving reflected terahertz radiation,
   a controller and evaluation unit (3) for driving the transmitter and receiver unit (2; 2a, 2b) and evaluating measuring signals (M) of the transmitter and receiver unit (2; 2a, 2b),
   wherein a beam splitting means (4, 40) is provided to split up the emitted terahertz radiation (10) into at least
      one first terahertz detection beam (10a, 10c) along a first optical partial axis (A1) and
      one second terahertz detection beam (10b, 10d) along a second optical partial axis (A2) different from the first optical partial axis (A1),
   a reflection device (5) for reflecting the second terahertz detection beam (10b, 10d) onto said test object (8) and reflecting the second terahertz detection beam (10b), reflected from said test object (8), back towards said beam splitting means (4) and/or said transmitter and receiver unit (2; 2a, 2b),
   said transmitter and receiver unit (2; 2a, 2b) generating at least one measuring signal (M, M1, M2) from the detection beams (10a, 10b, 10c, 10d) reflected on said test object (8) and putting it out to said controller and evaluation unit (3) for determining at least one layer thickness of said test object (8).

2. The terahertz measuring apparatus (1, 101) according to claim 1, wherein said beam splitting means (4, 40) reflects the terahertz detection beam (10b, 10d) reflected from said test object (8) back towards said transmitter and receiver unit (2) along the optical axis (A) and/or passes the same.

3. The terahertz measuring apparatus (1, 101) according to claim 1, wherein said reflection device (5) reflects the second terahertz detection beam (10b, 10d) at one or more mirror surfaces (5a, 5b), e.g. each by 90°, and directs then onto said test object (8) in the second optical partial axis (A2), and reflects the optical terahertz detection beam (10b, 10d) reflected from said test object (8) back twice.

4. The terahertz measuring apparatus (1, 101) according to claim 1, wherein the optical path lengths of the first and second terahertz detection beams (10a, 10c, 10b, 10d) are different from one another in such a way that the measurements in a common measuring signal (S) can be separated.

5. The terahertz measuring apparatus (1, 101) according to claim 1, wherein the first optical partial axis (A1) and the second optical partial axis (A2) are offset in relation to each other essentially by 90°, preferably in the same plane.

6. The terahertz measuring apparatus (1, 101) according to claim 1, wherein said beam splitting means is a beam splitter (4) partially passing the emitted terahertz radiation (10) as first partial terahertz radiation (10a) and partially reflecting it as second partial terahertz radiation (10b) to said reflection device (5), preferably at an angle of 90° compared to the optical axis (A),
   said transmitter and receiver unit (2; 2a, 2b) generating a common measuring signal (M) from the partial beams (10a, 10b) reflected on said test object (8) and putting this out to said controller and evaluation unit (3).

7. The terahertz measuring apparatus (1, 101) according to claim 1, wherein said beam splitting means comprises an adjustable mirror (40) and an adjustment means (41) for adjusting said mirror (40),
   said adjustable mirror (40) deflecting the emitted terahertz radiation (10) differently in a first position and second position, preferably without deflection in said first position and in said second with deflection at an angle of 90° compared to the optical axis (A),
   said transmitter and receiver unit (2; 2a, 2b) generating measuring signals (M1, M2) from the detection beams (10c, 10d) reflected at said test object (8) and putting the same out to said to said controller and evaluation unit (3).

8. The terahertz measuring apparatus (1) according to claim 1, wherein a combined transmitter and receiver unit (2), e.g. a THz transceiver, is provided both for emitting as well as for receiving the terahertz radiation (10).

9. The terahertz measuring apparatus (101) according to claim 1, wherein
   a receiver unit (2b) is provided separate from a transmitter unit (2a),
   whereby the terahertz radiation (10) emitted by the transmitter unit (2a) is split up by said beam splitting means (4, 40) into the two terahertz detection beams (10a, 10b, 10c, 10d), and the terahertz detection beam (10a, 10c) reflected from said test object (8) and the terahertz detection beam (10b, 10d) reflected from said test object (8) and said reflection device (5) each pass said beam splitting means (4, 40).

10. The terahertz measuring apparatus (1, 101) according to claim 9, wherein said receiver unit (2b) receives the terahertz-radiation (10b, 10d) passed by said beam splitting means (4, 40) and the terahertz detection beam (10a, 10c) reflected by said beam splitting means (4, 40).

11. The terahertz measuring apparatus (1, 101) according to claim 1, wherein in the optical axis (A) and/or in the optical partial axes (A1, A2) beam guiding elements are provided for focusing the beam.

12. The terahertz measuring apparatus according to claim 1, wherein terahertz radiation (10) in a frequency range of between 10 GHz and 10 THz is utilized.

13. An arrangement comprising the measuring device (1, 101) according to claim 1 and the test object (8),
whereby the optical path of the second terahertz detection beam (10b, 10d) from the beam splitting means (4, 40) via the reflection device (5) to the first point of impingement onto the test object (8) and back via the reflection device (5) to the beam splitting means (4, 40) (4, 40) is longer than the entire optical path of the first terahertz detection beam (10a) from the beam splitter (4) through the test object (8) and back to the beam splitter (4), for separating the first measuring peaks (P1, P2, P3, P4) of the first terahertz detection beam (10a, 10c) and the second measuring peaks (P5, P6, P7, P8) of the second terahertz detection beam (10b, 10d).

14. The arrangement according to claim 13, wherein a common measuring signal (S) for both measurements is provided and the second measuring peaks (P5, P6, P7, P8) of the second partial terahertz beam (10b) in the common measuring signal (M) are received by the transmitter and receiver unit (2; 2a, 2b) separately from the first measuring peaks (P1, P2, P3, P4), preferably after the former or alternatingly.

15. A terahertz measuring method for measuring a test object (8), comprising at least the following steps:
emitting a terahertz beam (10) along an optical axis (A) towards a beam splitting means (4, 40),
splitting up the terahertz radiation (10) into at least one first terahertz detection beam (10a, 10c) and one second terahertz detection beam (10b, 10d),
putting out the first terahertz detection beam (10a, c) along a first optical partial axis (A1) onto the test object (8) and reflecting back the first terahertz detection beam (10a, c) on boundary surfaces of the test object (8) as reflected first terahertz detection beam (10a) towards the beam splitting means (4, 40),
putting out the second terahertz detection beam (10b, d) via a reflection device (5) including reflecting at least once on the reflection device (5), and aligning the second terahertz detection beam (10b, d) along a second optical partial axis (A2) different from the first optical partial axis (A1) onto the test object (8),
reflecting back the second partial terahertz beam (10b) reflected from the test object (8) towards the beam splitting means (4, 40),
guiding the reflected first and second terahertz detection beam (10a, 10b, 10c, 10d) from the beam splitting means (4, 40) towards the transmitter and receiver unit (2; 2a, 2b) and receiving the same in the transmitter and receiver unit (2; 2a, 2b),
generating at least one measuring signal (M, M1, M2) and evaluating said measuring signal (M M1, M2) and determining layer thicknesses of the test object (8).

16. The measuring method according to claim 15, wherein the emitted terahertz radiation (10) is split up, by means of a beam splitter (4) serving as beam splitting means, simultaneously into a first partial beam (10a) representing the first detection beam and a second partial beam (10b) representing the second detection beam, and following reflection on the test object (8), is re-merged and subsequently incorporated in a common measuring signal (M).

17. The measuring method according to claim 16, wherein the second terahertz radiation (10b) is emitted in an optical path which is longer compared to the first partial terahertz beam (10a) in such a way that the duration of the first measuring signal (M1) of the first partial terahertz beam (10a) is shorter than the temporal delay ($\Delta t$) of the second measuring signal (M2) in relation to the first measuring signal (M1), and the two measuring signals (M1, M2) of the partial terahertz beams (10a, 10b) are present in the common measuring signal (M) separated in time.

18. The measuring method according to claim 15, wherein, as beam splitting means, an adjustable mirror (40) is adjusted between a first and second position, in which it deflects the THZ radiation along different optical partial axes (A1, A2).

* * * * *